(12) United States Patent
Gaucher et al.

(10) Patent No.: US 12,280,747 B2
(45) Date of Patent: Apr. 22, 2025

(54) CONNECTOR FOR A WIPER BLADE

(71) Applicant: VALEO SYSTEMES D'ESSUYAGE, La Verriere (FR)

(72) Inventors: Vincent Gaucher, La Verriere (FR); Guillaume Mouleyre, La Verriere (FR); Stephane Houssat, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/005,861

(22) PCT Filed: Jul. 13, 2021

(86) PCT No.: PCT/EP2021/069537
§ 371 (c)(1),
(2) Date: Jan. 18, 2023

(87) PCT Pub. No.: WO2022/023032
PCT Pub. Date: Feb. 3, 2022

(65) Prior Publication Data
US 2023/0322187 A1    Oct. 12, 2023

(30) Foreign Application Priority Data
Jul. 27, 2020    (FR) ...................................... 2007899

(51) Int. Cl.
*B60S 1/40*    (2006.01)
*B60S 1/38*    (2006.01)

(52) U.S. Cl.
CPC ........... *B60S 1/4006* (2013.01); *B60S 1/3849* (2013.01); *B60S 1/3867* (2013.01); *B60S 2001/4022* (2013.01); *B60S 2001/4035* (2013.01)

(58) Field of Classification Search
CPC .... B60S 1/3849; B60S 1/4006; B60S 1/4009; B60S 1/3867; B60S 2001/4035; B60S 2001/4022; B60S 2001/4061
(Continued)

(56) References Cited

U.S. PATENT DOCUMENTS 8,286,298 B2    10/2012    Kim
10,493,959 B2    12/2019    Gaucher et al.
(Continued)

FOREIGN PATENT DOCUMENTS

CN    2900271 Y    5/2007
CN    111845644 A    10/2020
(Continued)

OTHER PUBLICATIONS

European Patent Office, International Search Report (with English translation) and Written Opinion of corresponding International Application No. PCT/EP2021/069537, dated Sep. 29, 2021.
(Continued)

*Primary Examiner* — Gary K. Graham
(74) *Attorney, Agent, or Firm* — Valeo Systemes d'Essuyage

(57) ABSTRACT

A connector for a wiper blade, comprising at least a main body and a rotating cap, comprising at least one cover wall, a reinforcing wall, a hinge and an attachment device for rigidly connecting the rotating cap relative to an end wall of the main body, the hinge being arranged at one of the longitudinal ends of the cover wall and ensuring a rotation of the rotating cap about an axis, the reinforcing wall extending from the cover wall towards the end wall of the main body, the rotating cap further comprising a device for supporting the rotating cap on the end wall of the main body.

9 Claims, 6 Drawing Sheets

(58) Field of Classification Search
USPC .................................................... 15/250.32
See application file for complete search history.

(56) References Cited

U.S. PATENT DOCUMENTS

2008/0163448 A1    7/2008  Yang et al.
2017/0080901 A1*   3/2017  Houssat .................. B60S 1/381

FOREIGN PATENT DOCUMENTS

| DE | 102007016479 A1 | 10/2008 |
| DE | 202009013452 U1 | 2/2010 |
| EP | 3000665 A1 | 3/2016 |
| JP | 2010-018273 A | 1/2010 |
| JP | 2016-028947 A | 3/2016 |
| WO | 2007142390 A1 | 12/2007 |

OTHER PUBLICATIONS

Japan Patent Office, Notice of Reasons for Refusal (with English translation) of corresponding Japanese Patent Application No. 2023-505806, dated Feb. 27, 2024.

* cited by examiner

[Fig. 1]
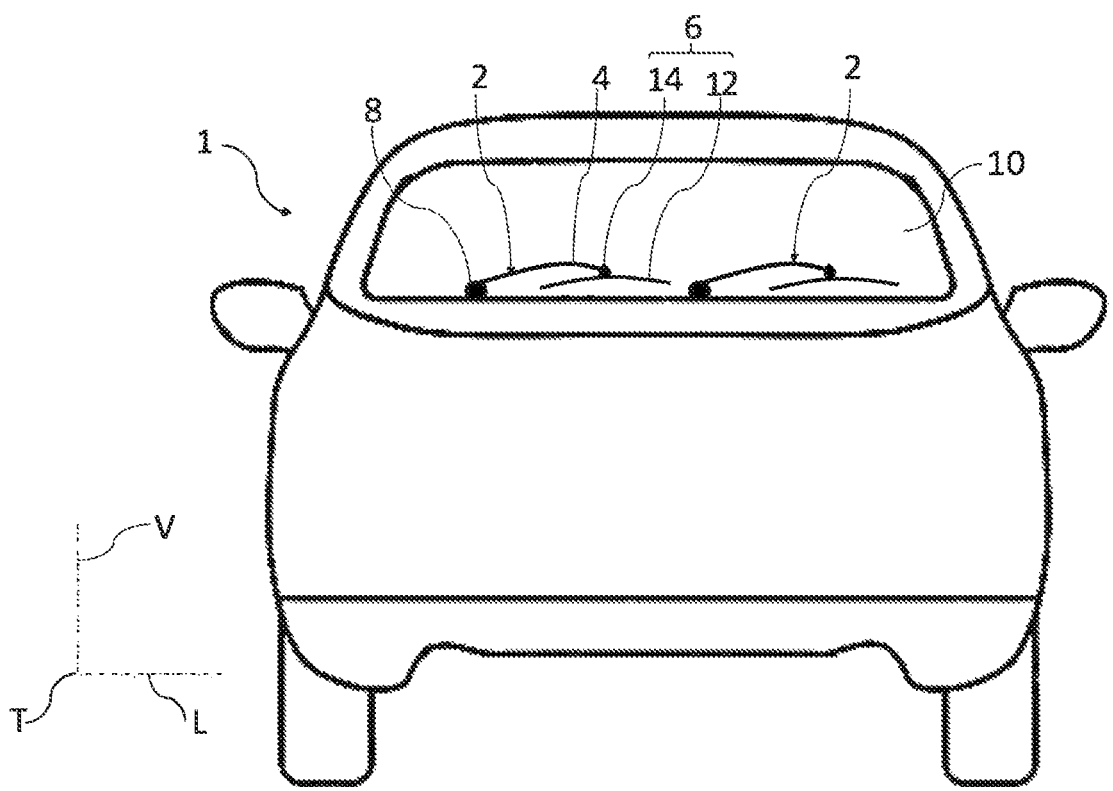
[Fig. 2]
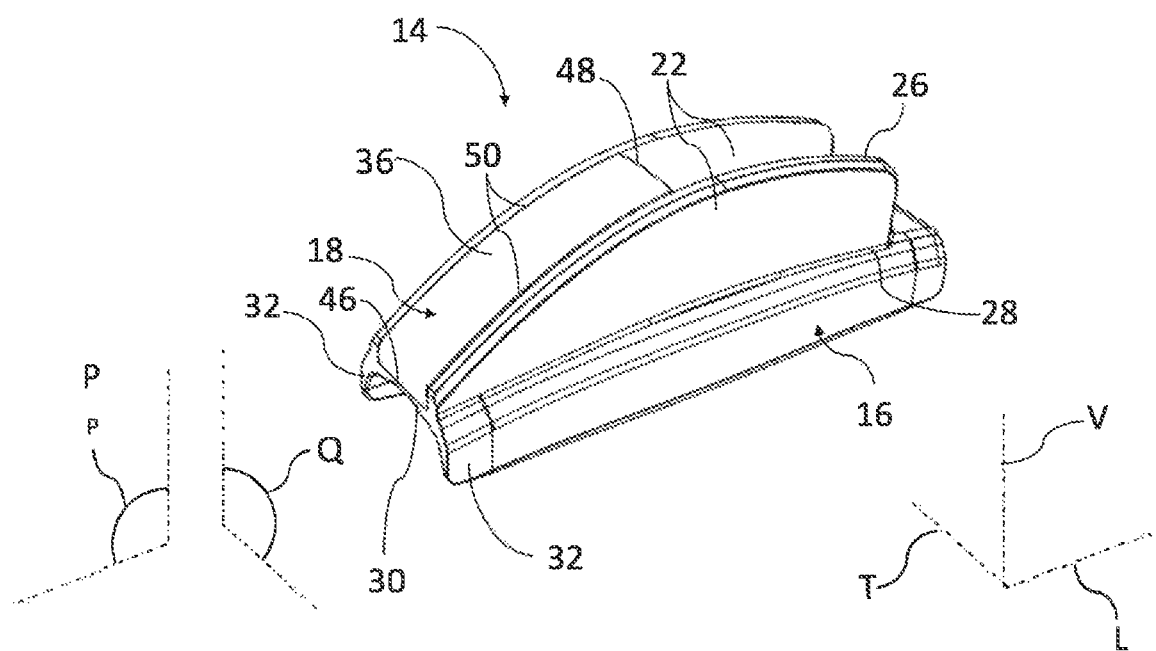

[Fig. 3]
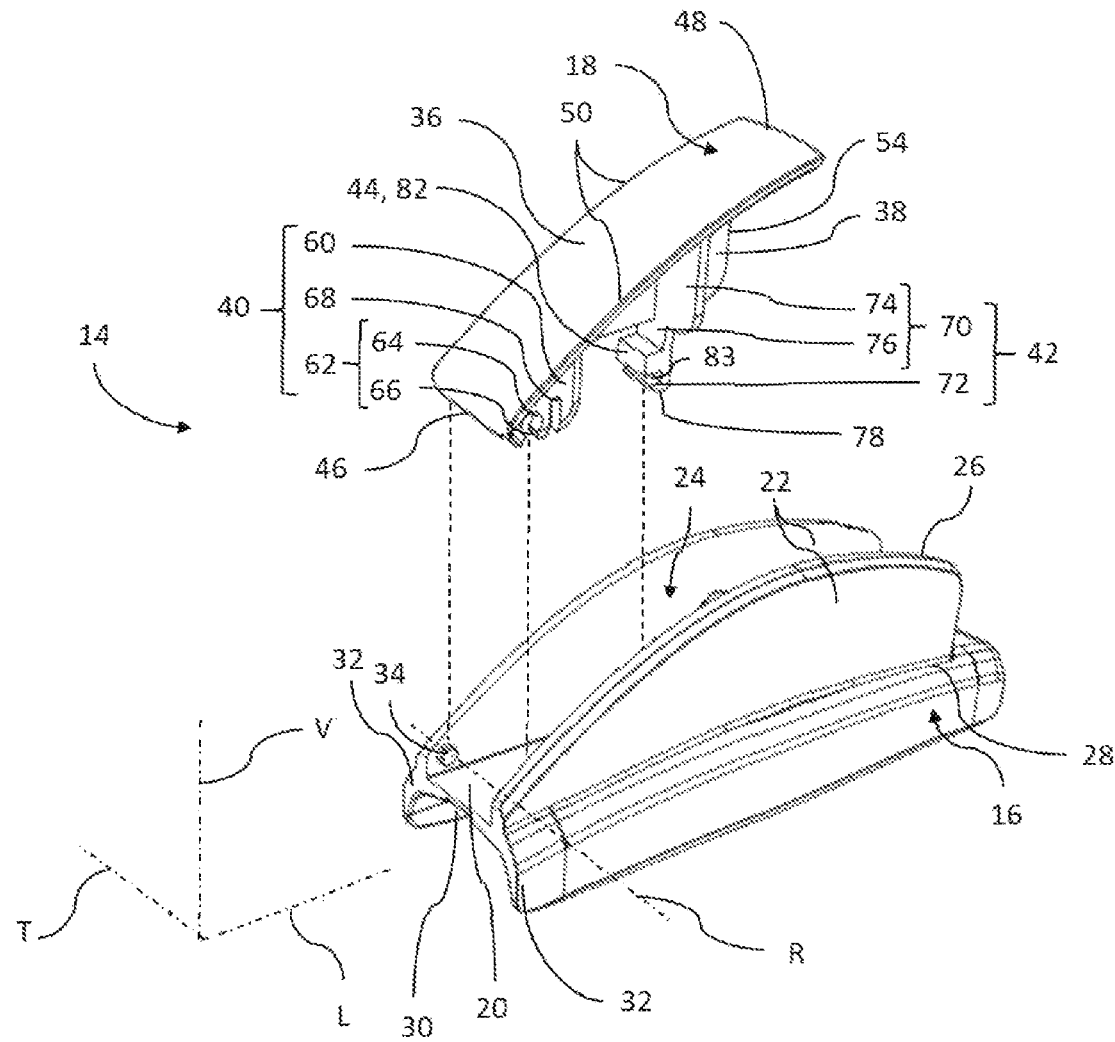
[Fig. 4]
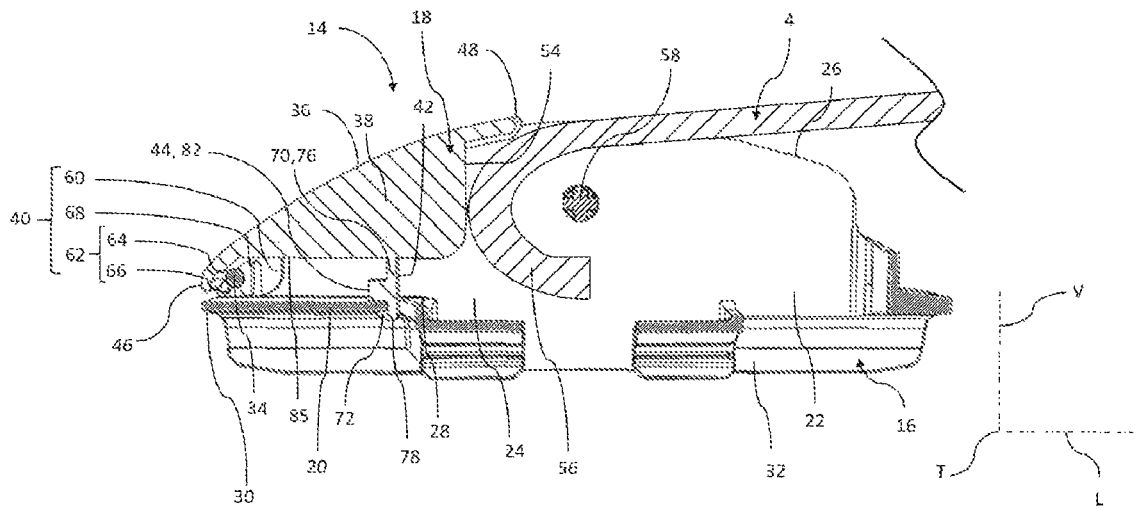

[Fig. 5]
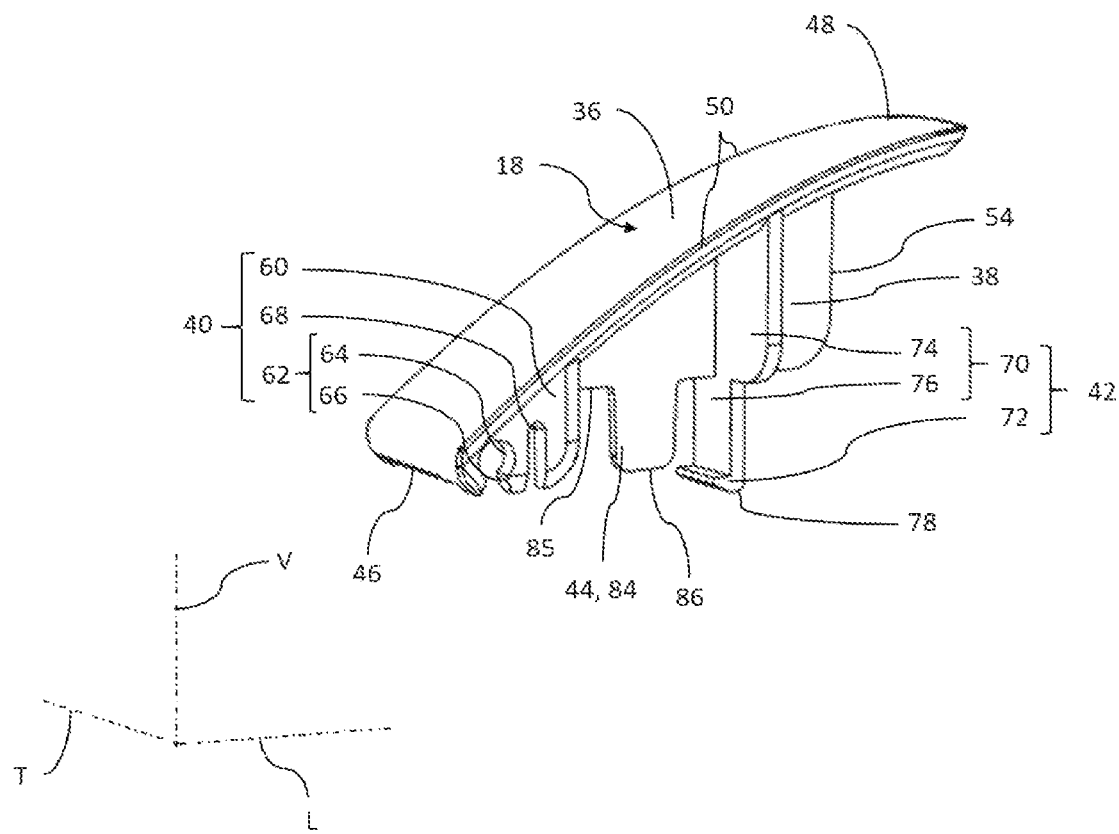
[Fig. 6]
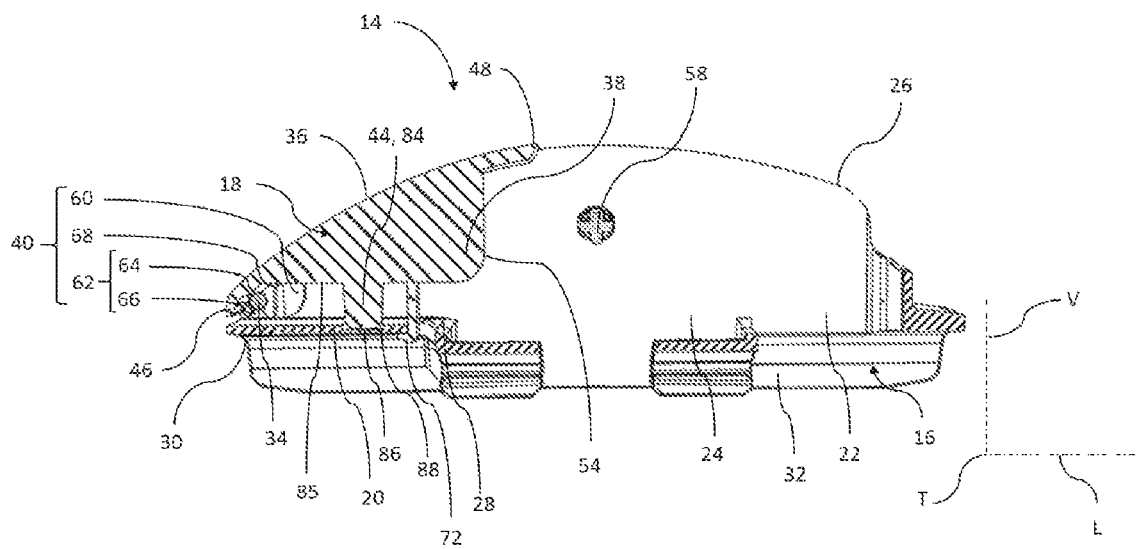

[Fig. 7]
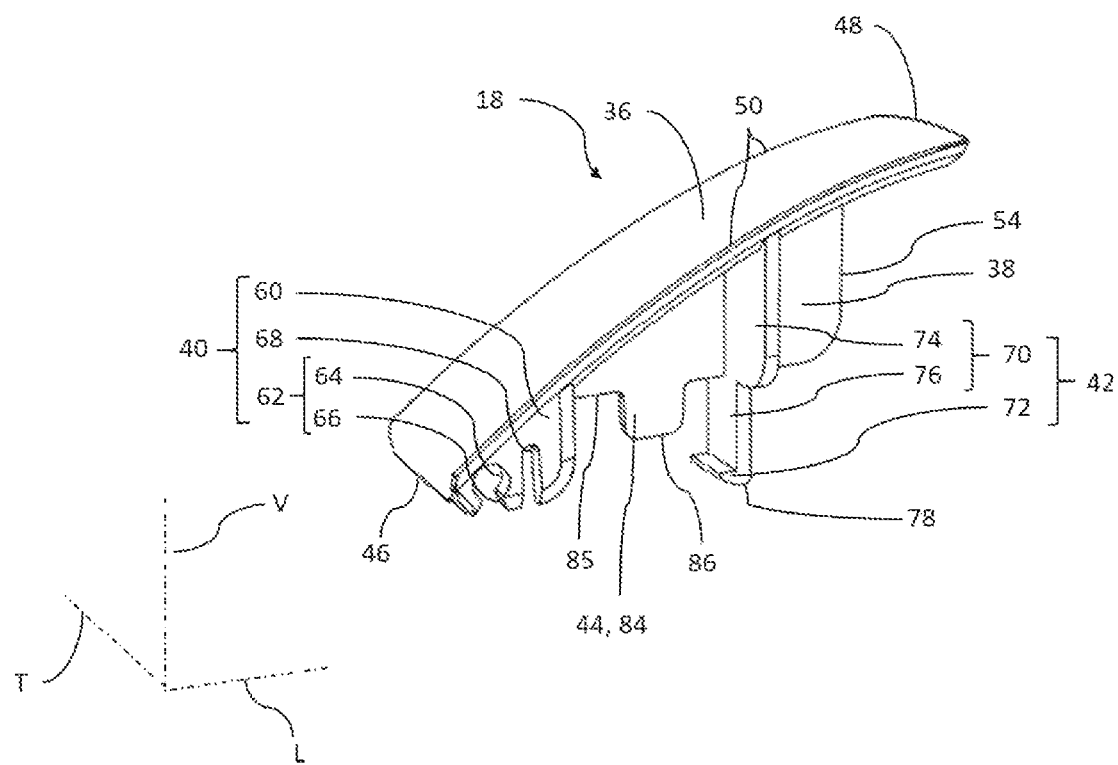
[Fig. 8]
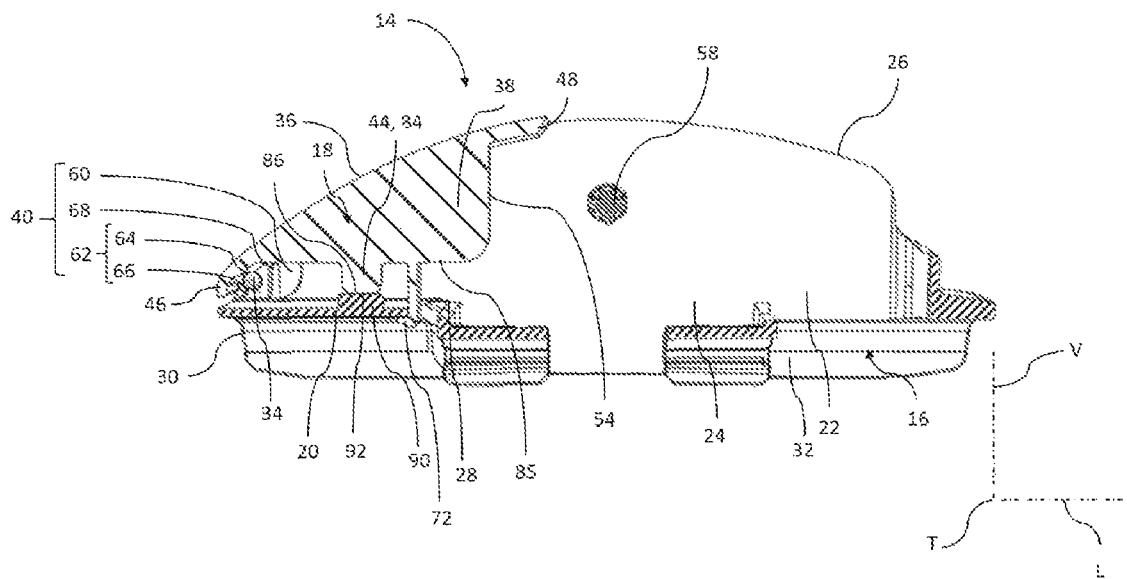

[Fig. 9]
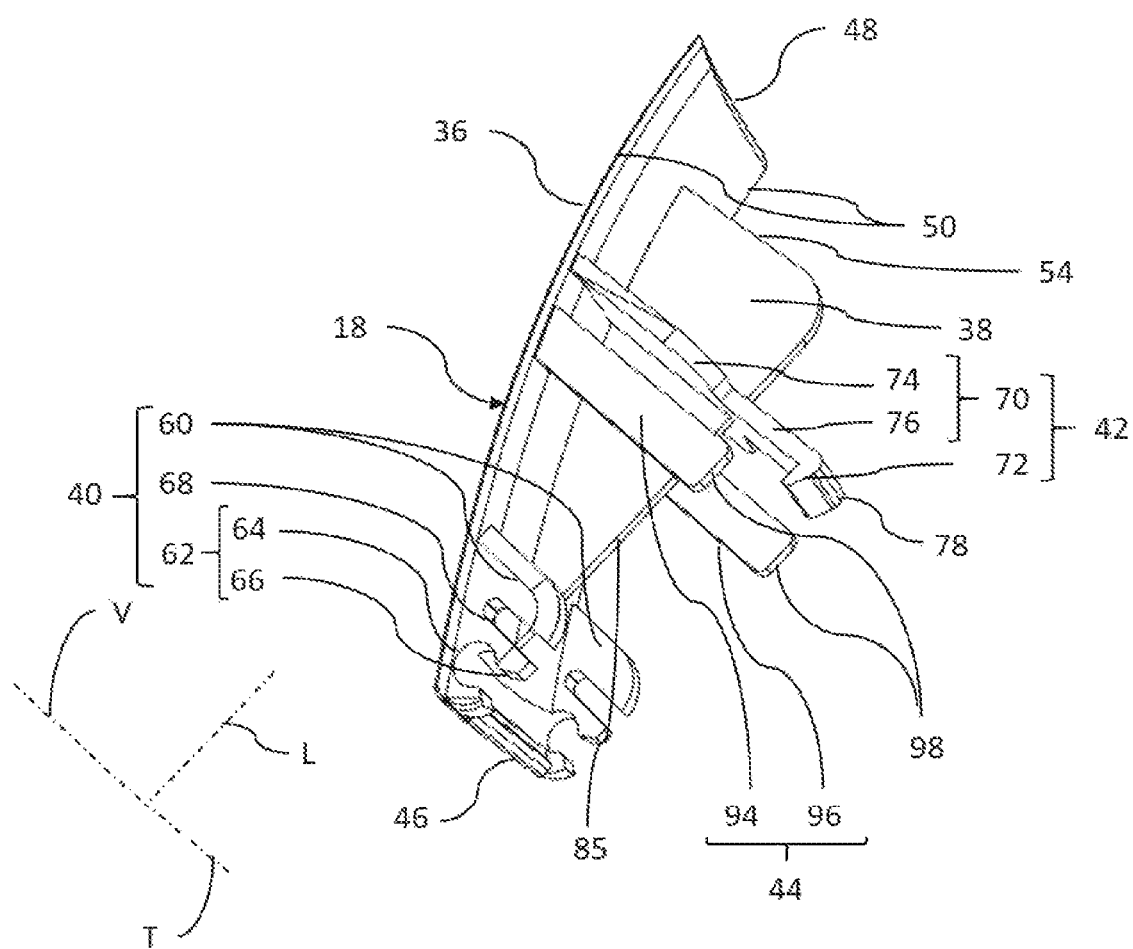

[Fig. 10]
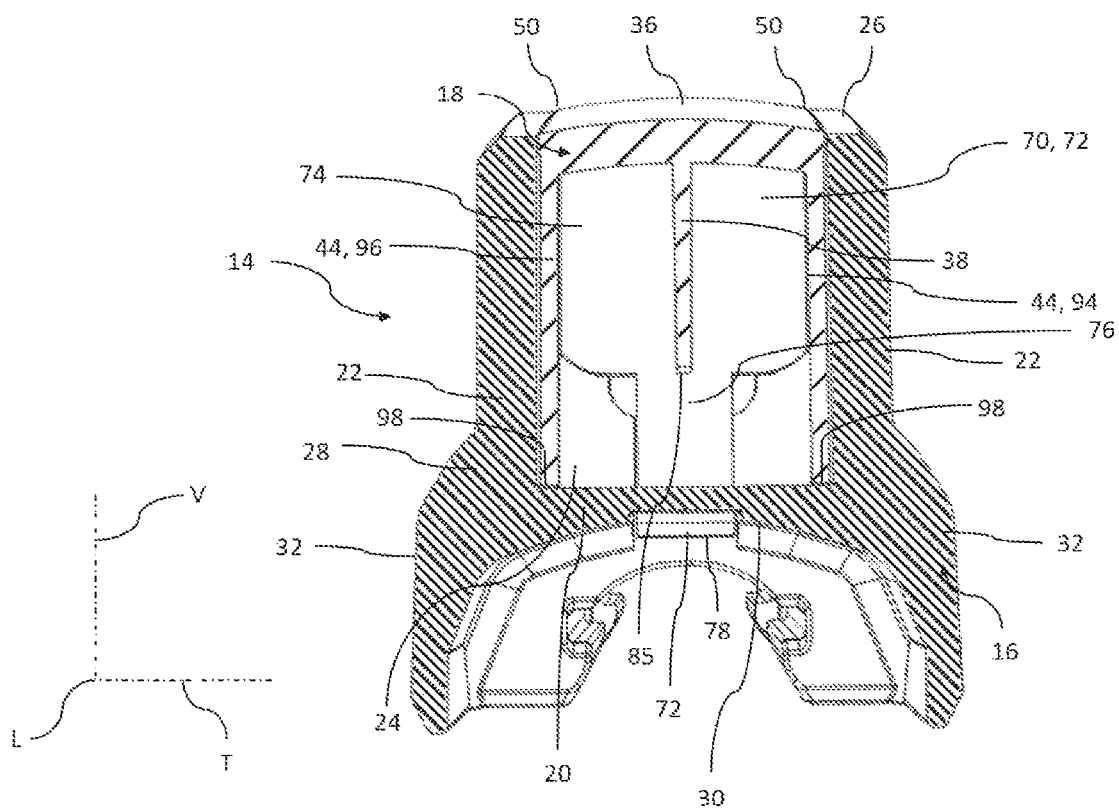

CONNECTOR FOR A WIPER BLADE

TECHNICAL FIELD

The present invention relates to the field of wiper devices for wiping glazed surfaces of motor vehicles

BACKGROUND OF THE INVENTION

Typically, a wiper system intended to be fitted to a motor vehicle comprises at least one wiper designed to come into contact with a glazed surface such as the windshield of a motor vehicle and at least one wiper arm designed to drive the rotation of the wiper. The wiper conventionally comprises a wiper blade, generally made of rubber, designed to rub against the glazed surface of the vehicle in order to remove water and/or dirt by clearing it away from the driver's field of view. The wiper is held by an arm which is driven by a motor in an angularly reciprocating motion.

In such devices, the wiper comprises at least an adapter, a connector, and a wiper blade. The adapter has a first portion connected to the connector of the wiper and a second portion connected to the arm. The adapter is conventionally mounted with the ability to pivot with respect to the connector so as to provide a rotational connection between the arm and the wiper, thus allowing the wiper to follow changes to the curvature of the glazed surface of the vehicle.

The wiper moves back and forth, carrying the wiper blade over the glazed surface, which means that the wiper blade removes the water and dirt that have accumulated on the glazed surface of the vehicle. However, over time the wiper blade becomes worn and its wiping effectiveness decreases. The user therefore has to change the wiper when safe-driving conditions are no longer met. The user detaches the connector of the worn wiper from the arm and then attaches a new wiper to the arm.

It is known for one type of arm to have a fixing element in the form of a hook. In this particular embodiment, the connector of the wiper generally comprises a shaft on which the adapter is positioned, the hook of the arm then fixing onto the adapter. There is an opening on the connector so that the hook of the arm can be inserted and engage with the adapter. The hook of the arm and the adapter of the wiper generally each comprise locking elements allowing the wiper to remain securely attached to the arm.

The opening in the connector needs to be large enough to allow the hook of the arm to engage with the adapter. Consequently, and once the wiper has been mounted on the arm, the arm fills only part of the opening. The connector generally comprises a cover that at least partially closes the opening in the connector that has been left uncovered by the hook of the arm engaging with the adapter, the purpose of this cover being to prevent the ingress of dirt and water into the connector through its opening.

Such a cover is thus removable so that it does not hamper the fitting and removal of the wiper in relation to the arm. In other words, and as is illustrated in FIG. 16 of document DE202009013452U, the cover is able to adopt a position in which it at least partially covers the opening in the connector. However, such a cover is not held in position and is liable to become pushed into the connector to a greater or lesser extent depending on the type of hook encountered. This lack of a reliable positioning of the cover on the one hand has an impact on the reliability of the longitudinal immobilization of the hook on the adapter and on the other hand leads to an inesthetic appearance of the wiper system overall.

SUMMARY OF THE INVENTION

In that context, the present invention thus proposes to correct these two shortcomings.

A main subject of the present invention is a connector for a wiper, comprising at least a main body and a rotary cover, the main body comprising at least a bottom wall and two lateral walls that contribute to delimiting an internal volume that is at least partially closed by the rotary cover, the rotary cover comprising at least a covering wall, a reinforcing wall, an articulation and an attachment device for securing the rotary cover relative to the bottom wall of the main body, the covering wall extending longitudinally between two longitudinal ends, the articulation being formed at one of the longitudinal ends of the covering wall and allowing the rotary cover to rotate about an axis, the reinforcing wall extending from the covering wall toward the bottom wall of the main body, characterized in that the rotary cover comprises a bearing device via which the rotary cover bears against the bottom wall of the main body.

The wiper is configured to be connected to an arm of a vehicle wiper system. The wiper connector at least partially provides for the connection between the wiper and the arm of the wiper system. The wiper thus comprises a wiper blade which is generally secured to the main body. The rotary cover itself closes part of the internal volume delimited by the lateral walls and the bottom wall of the main body. Another part of this internal volume remains open to the outside so as to allow the arm of the vehicle wiper system to be at least partially housed in the internal volume and project out of this volume.

The rotary cover is able to move about an axis adopting a first position in which the positional-attachment device secures the rotary cover to the main body and closes part of the internal volume of the rotary cover, and a second position in which the rotary cover is at least partially positioned outside the internal volume of the main body.

According to one optional feature of the invention, the bearing device is in contact with the bottom wall of the main body. In that way, the bearing device prevents the rotary cover from being pushed into the internal volume while at the same time effectively maintaining the position of the rotary cover relative to the main body so that this cover effectively performs its function of immobilizing the hook of the arm.

According to another optional feature of the invention, the attachment device comprises a support wall and a fixing lug, the support wall extending from the covering wall toward the bottom wall of the main body and having a free end, the fixing lug being formed at a free end of the support wall so as to attach the rotary cover to the bottom wall of the main body.

According to another optional feature of the invention, the support wall of the attachment device extends in a plane secant to and distinct from the plane in which the reinforcing wall is inscribed.

It will be appreciated that the support wall and the reinforcing wall extend relative to one another to form a cross extending from the covering wall toward the bottom wall of the main body.

According to another feature of the invention, the fixing lug of the rotary cover collaborates with the bottom wall of the main body to secure the rotary cover to the main body.

According to another optional feature of the invention, the bearing device of the rotary cover forms a block which projects from the support wall.

In other words, the bearing device forms a rectangular parallelepiped emerging from the support wall toward the articulation.

According to another optional feature of the invention, the bearing device and the fixing lug delimit a groove configured to at least partially house the bottom wall of the main body.

When the bottom wall is at least partially housed in the groove partially formed by the bearing device and the fixing lug, the rotary cover is locked to the main body.

According to another optional feature of the invention, the bearing device forms a protrusion of the reinforcing wall extending toward the bottom wall of the main body, the bearing device comprising a free edge configured to be in contact with the bottom wall.

The protrusion is a portion of the reinforcing wall that has a longitudinal dimension smaller than the longitudinal dimension of the reinforcing wall itself. This longitudinal dimension is measured along an axis parallel to a main direction of extension of the main body.

According to another optional feature of the invention, the bottom wall comprises a slot at least partially housing the free edge of the bearing device. The slot is formed in the bottom wall facing the bearing device, the free end of the protrusion that forms the bearing device becoming partially housed in the slot, the rotary cover thus bearing against the bottom of the slot.

According to another optional feature of the invention, the bottom wall comprises a rib extending toward the rotary cover, the free edge of the bearing device being in contact with the rib of the bottom wall. The rib is formed on the bottom wall facing the bearing device, the free end of the protrusion that forms the bearing device being in contact with one end edge of the rib, the rotary cover thus bearing against the end edge of the rib.

According to another optional feature of the invention, the covering wall comprises two lateral edges extending between each of the longitudinal ends of the covering wall and configured to be in contact with the lateral walls of the main body, the bearing device comprising at least one tab extending in a plane parallel to the main plane of extension of the reinforcing wall and projecting from one of the lateral edges of the covering wall toward the bottom wall of the main body.

According to another optional feature of the invention, the covering wall of the rotary cover is housed in the internal volume of the main body.

Each of the lateral walls extends from the bottom wall toward one end edge. When the rotary cover is secured to the main body by the fixing lug, the covering wall lies flush with at least one of the end edges of the lateral walls.

According to another optional feature of the invention, the articulation comprises at least one rotation bearing which is open and in which there is housed at least one pin of the main body, the rotary cover pivoting about the pin of the main body, the articulation comprising at least one notch distinct from the rotation bearing and facilitating the insertion of the pin of the main body into the rotation bearing.

The invention also relates to a wiper comprising at least one connector according to any of the above features.

BRIEF DESCRIPTION OF DRAWINGS

Further features, details and advantages of the invention will become more clearly apparent, on the one hand from reading the following description, and on the other hand from several exemplary embodiments given by way of nonlimiting indication, with reference to the attached schematic drawings, in which:

FIG. 1 is a depiction of a vehicle comprising a wiper system equipped with a wiper according to the invention;

FIG. 2 is a perspective view of a connector according to a first embodiment;

FIG. 3 is an exploded view of the connector according to FIG. 2;

FIG. 4 is a longitudinal section of the connector according to FIG. 2;

FIG. 5 is a perspective view of a rotary cover of a connector according to a second embodiment;

FIG. 6 is a longitudinal section of the connector according to FIG. 5;

FIG. 7 is a perspective view of a rotary cover of a connector according to a third embodiment;

FIG. 8 is a longitudinal section of the connector according to FIG. 7;

FIG. 9 is a perspective view of a rotary cover of a connector according to a fourth embodiment;

FIG. 10 is a vertical section of the connector according to FIG. 9.

DETAILED DESCRIPTION OF THE INVENTION

The features, variants and different embodiments of the invention may be combined with one another, in various combinations, provided that they are not mutually incompatible or mutually exclusive. It will be possible, in particular, to imagine variants of the invention that comprise only a selection of the features described below, in isolation from the other features described, if this selection of features is sufficient to confer a technical advantage and/or to distinguish the invention from the prior art.

In the following description, the terms "longitudinal", "transverse" and "vertical" refer to the orientation of a connector according to the invention. A longitudinal direction is a main direction of extension of a main body of the connector, this longitudinal direction being parallel to a longitudinal axis L of a reference frame L, V, T shown in the figures, and parallel to an overall direction of extension of a wiper. A transverse direction corresponds to a direction parallel to a transverse axis along which a cylinder of the main body of the connector mainly extends, this transverse direction being parallel to a transverse axis T of the reference frame L, V, T, and this transverse axis T being perpendicular to the longitudinal axis L. Finally, a vertical direction corresponds to a direction parallel to a vertical axis V of the reference frame L, V, T, this vertical axis V being perpendicular to the longitudinal axis L and the transverse axis T.

With reference first of all to FIG. 1, a vehicle 1 is equipped with at least one wiper system 2 comprising at least one arm 4, a wiper 6 and an electric motor 8 secured to the vehicle 1 and configured to drive the arm 4 and the wiper 6 in motion across a glazed surface 10 of the vehicle 1. The arm 4 of the wiper system 2 is connected on the one hand, at one of its longitudinal ends, to the electric motor 8 and, on the other hand, at its other longitudinal end, to the wiper 6.

The electric motor 8 drives, in an angular back and forth movement, both the arm 4 and the wiper 6 so that the wiper system 2 performs its wiping function. For that, the wiper 6 comprises at least one wiper blade 12 and a connector 14 at which one of the longitudinal ends of the arm 4 is fixed. The wiper blade 12 of the wiper is pressed intimately against the glazed surface 10 of the vehicle 1. When the electric motor 8 drives the arm 4 and the wiper 6 in an angular back-and-forth movement over the glazed surface 10, the wiper blade 12 wipes the glazed surface 10 of the vehicle 1.

The connector 14 generally houses an adapter to which the arm 4 is attached. The connector 14 and the adapter thus form a connection between the arm 4 and the wiper 6 while allowing the wiper blade 12 to adapt its position on the glazed surface 10 of the vehicle 1 as the arm 4 and the wiper 6 are driven in motion by the electric motor 8 of the vehicle 1.

As illustrated in FIGS. 2 and 3, the connector 14 comprises at least a main body 16 and a rotary cover 18, the main body 16 comprising at least a bottom wall 20 and two lateral walls 22 that contribute to delimiting an internal volume 24 that is at least partially closed by the rotary cover 18. The connector 14 extends mainly in a longitudinal direction L, each wall of the main body 16 extending at least in this longitudinal direction L. The lateral walls 22 also extend in a vertical direction V between an upper end 26 and a lower end 28, the vertical direction V being perpendicular to the longitudinal direction L. The bottom wall 20 itself extends in a transverse direction T between the lateral walls 22 of the main body 16, advantageously at the lower ends 28 thereof, the transverse direction T being perpendicular to the longitudinal direction L and vertical direction V. The lateral walls 22 and the bottom wall 20 contribute to delimiting the internal volume 24 in which are housed the rotary cover 18 and, as more particularly illustrated in FIG. 4, one of the ends of the arm 4.

Each of the upper ends 26 of the lateral walls 22 extends longitudinally, substantially adopting a curved shape. In that way, a height of one of the lateral walls 22 at one or the other of the longitudinal ends thereof, which is to say one of the ends of the lateral walls 22 in the longitudinal direction L, has a dimension smaller than a height of this same lateral wall 22 measured between these longitudinal ends, this height being measured along an axis parallel to the vertical direction V.

In the example illustrated in FIGS. 2 and 3, the main body 16 also comprises a support 30 for the wiper blade of the wiper. This support 30 adopts the overall shape of a U of which the base is at least partially formed by the bottom wall 20 and where each of the branches of the U are made up of an attachment wall 32 extending at least in the vertical direction V from the bottom wall 20 in the opposite direction to the lateral walls 22 of the main body 16.

The main body 16 comprises, according to the example illustrated in FIG. 3, a pair of pins 34 projecting from each of the lateral walls 22 toward the other lateral wall 22. The pair of pins 34 extends in the transverse direction T at one of the longitudinal ends of the main body 16. These pins 34 are configured to collaborate with the rotary cover 18 so as to form a pivot for the rotary cover 18 relative to the main body 16. In an alternative embodiment, the main body 16 comprises a shaft in place of the pair of pins 34, the shaft extending transversely between the lateral walls 22 of the main body 16 at one of the longitudinal ends of the main body 16.

The rotary cover 18 may be housed at least partially, or even completely, in the internal volume 24 the main body 16. The rotary cover 18 comprises a covering wall 36, a reinforcing wall 38, an articulation 40, an attachment device 42 for securing the rotary cover 18 relative to the bottom wall 20 of the main body 16 and, according to the invention, a bearing device 44 via which the rotary cover 18 bears against the bottom wall 20 of the main body 16.

The covering wall 36 extends longitudinally between a first longitudinal end 46 and a second longitudinal end 48, the first longitudinal end 46 of the covering wall 36 being positioned at one of the longitudinal ends of the main body 16. The covering wall 36 also comprises two lateral edges 50 extending between each of the longitudinal ends 46, 48 of the covering wall 36 and configured to be in contact with the lateral walls 22 of the rotary cover 18. More specifically, the lateral edges 50 are configured to be in contact with the upper ends 26 of the lateral walls 22 of the main body 16 so as to lie flush with these lateral walls 22 when the rotary cover 18 is in the closed position.

The covering wall 36 more or less follows the curved shape of the upper ends 26 of the lateral walls 22. When the rotary cover 18 is housed in the internal volume 24 of the main body 16, the covering wall 36 at least partially closes this internal volume 24, from one of the longitudinal ends of the main body 16 toward the other. The covering wall 36 does not, however, close the entirety of the internal volume 24 as part of this volume needs to be accessible to the arm of the wiper system.

The reinforcing wall 38 of the rotary cover 18 extends from the covering wall 36 toward the bottom wall 20 of the main body 16 in the longitudinal direction L and a vertical direction V. Advantageously, the reinforcing wall 38 is formed at equal distances from the lateral edges 50 of the covering wall 36, which is to say that the reinforcing wall 38 is centered on the covering wall 36 relative to the lateral edges 50 of the covering wall 36 and in the transverse direction T. The reinforcing wall 38 extends longitudinally from the first longitudinal end 46 of the covering wall 36 toward one longitudinal edge 54, the latter being closer to the first longitudinal end 46 than to the second longitudinal end 48 of the covering wall 36. This longitudinal edge 54 of the reinforcing wall 38 is configured to come to bear against the hook of the arm in order to immobilize the wiper longitudinally relative to the arm.

As illustrated in FIG. 4, which is a view of the connector 14 in section on a first plane of section P passing through the connector, parallel to the longitudinal direction L and vertical direction V and illustrated in FIG. 2, the longitudinal edge 54 of the reinforcing wall 38 is in contact with one of the ends of the arm 4, that end here taking the form of a hook 56. For that purpose, the connector 14 comprises a cylinder 58 around which an adapter (not depicted) is generally installed and, when the wiper is mounted on the arm 4 of the vehicle, around which the hook 56 of the arm 4 is positioned. The longitudinal edge 54 of the reinforcing wall 38 butts against the hook 56 preventing any movement of the wiper relative to the hook 56 in the longitudinal direction.

The articulation 40 of the rotary cover 18 is positioned at the first longitudinal end 46 of the covering wall 36 and is configured to collaborate with at least one of the pins 34 of the pair of pins 34 or with the shaft of the main body 16, all as detailed hereinabove.

The articulation 40 consists of at least a lateral web 60 extending from one of the lateral edges 50 of the covering wall 36 toward the bottom wall 20 of the main body 16 in the longitudinal direction L and vertical direction V. The lateral web 60 comprises at least one rotation bearing 62 open to the outside and in which one of the pins 34 of the pair of pins 34 or the shaft of the main body 16 becomes housed. It will be appreciated that the rotation bearing 62 takes the form of a through-orifice 64 passing through the lateral web 60, this through-orifice 64 comprising a slot 66 opening the through-orifice 64 to the outside of the lateral web 60. More specifically, the slot 66 extends vertically from the through-orifice 64 toward the bottom wall 20 of the main body 16. This slot 66 allows one of the pins 34 of the pair of pins 34 or the shaft of the main body 16 to progress toward the through-orifice 64, so that the rotary cover 18 can be mounted on the main body 16. In that way, the rotary cover 18 can be made to rotate about one of the pins 34 of the pair of pins 34 or about the shaft of the main body 16, one of the pins 34 of the pair of pins 34 or the shaft thus having an axis of rotation R of the rotary cover 18 passing through it.

The articulation 40 additionally comprises a notch 68 distinct from the rotation bearing 62 and facilitating the insertion of one of the pins 34 of the pair of pins 34 or of the shaft of the main body 16 into the rotation bearing 62 of the rotary cover 18. Specifically, when one of the pins 34 of the pair of pins 34 or the shaft is inserted into the rotation bearing 62, at least part of the lateral web 60, which part is formed between the rotation bearing 62 and the notch 68, tends to deform elastically to allow the insertion of one of the pins 34 of the pair of pins 34 or of the shaft in the through-orifice 64 of the bearing. Once one of the pins 34 of the pair of pins 34 or the shaft has been housed in the rotation bearing 62, that part of the lateral web 60 that is formed between the rotation bearing 62 and the notch 68 reverts to its initial shape.

Advantageously, the articulation 40 comprises two lateral webs 60 as described above, each extending from one of the lateral edges 50 of the covering wall 36 toward the bottom wall 20 of the main body 16.

As illustrated in FIG. 3, the attachment device 42 of the rotary cover 18 comprises a support wall 70 and a fixing lug 72 arranged on the support wall 70. The support wall 70 here extends from the covering wall 36 toward the bottom wall 20 of the main body 16, the support wall 70 being closer to the second longitudinal end 48 of the covering wall 36 than to the first longitudinal end 46 of the covering wall 36. The support wall 70 extends in a plane secant to and not coincident with a plane in which the reinforcing wall 38 is inscribed. More specifically and according to the example illustrated here, the support wall 70 extends mainly parallel to the transverse direction T and vertical direction V, which is to say to form a cross with the reinforcing wall 38.

The support wall 70 comprises a first section 74 and a second section 76, the first section 74 having a greater width than the second section 76, a width being measured along an axis parallel to the transverse direction T. The first section 74 of the support wall 70 extends from the reinforcing wall 38 as far as the second section 76, the latter extending the first portion vertically toward the bottom wall 20 of the main body 16.

The support wall 70 has a free end 78 at which the fixing lug 72 for fixing the rotary cover 18 to the bottom wall 20 of the main body 16 is formed. The fixing lug 72 extending longitudinally from the free end 78 of the support wall 70 toward the first longitudinal end 46 of the covering wall 36.

The fixing lug 72 of the rotary cover 18 allows the rotary cover 18 to be attached reversibly relative to the bottom wall 20 of the main body 16. During the mounting of the rotary cover 18, the fixing lug 72 and the support wall 70 deform slightly to become positioned against an external face of the bottom wall 20, this external face being on the opposite side of the fixing lug 72 to the covering wall. In that way, the fixing lug 72 at least partially immobilizes the rotary cover 18 in terms of rotational movement about one of the pins 34 of the pair of pins 34 or about the shaft of the main body 16, while at the same time ensuring a well-defined position for the rotary cover 18 relative to the main body 16. To simplify the deformation of the fixing lug 72 and of the support wall 70, this lug has a chamfered face oriented toward an internal face of the bottom wall 20 which is oriented toward the internal volume 24 of the main body 16.

According to the invention, the rotary cover 18 comprises the bearing device 44 via which the rotary cover 18 bears against the bottom wall 20 of the main body 16. According to the example illustrated in FIGS. 3 and 4, the bearing device 44 of the rotary cover 18 forms a block 82 which projects from the support wall 70 toward the articulation 40 of the rotary cover 18. More specifically, the block 82 is a rectangular parallelepiped extending longitudinally from the second section 76 of the support wall 70 toward the first longitudinal end 46 of the covering wall 36. The block 82 here extends transversely across the entire width of the second section 76 of the support wall 70, but a block 82 extending over only part of the width of the second section 76 of the support wall 70 would not constitute a departure from the scope of the invention.

The bearing device 44 and the fixing lug 72 contribute to delimiting a groove 83 configured to at least partially house the bottom wall 20 of the main body 16. Specifically, the height of the groove 83 formed is at least slightly greater than the height of the bottom wall 20 so that the latter can extend at least partially between the fixing lug 72 and the block 82, forming the bearing device 44.

As illustrated in FIG. 4, the block 82 has a contact face facing toward the bottom wall 20 in contact with the internal face of the bottom wall 20. Once the rotary cover 18 has been secured to the main body 16 by the fixing lug 72, the block 82 forms an end stop for the abutment of the rotary cover 18 against the bottom wall 20. The bearing device 44, which here is formed at least by the block 82, thus prevents the rotary cover 18 from being pushed further into the internal volume 24 of the main body 16.

A second embodiment of the invention will now be described with reference to FIGS. 5 and 6, and in this embodiment certain references used in the description of the first embodiment will also be reused, these references being attributed to objects of the invention that are similar or identical.

According to this second embodiment and with reference to FIG. 5, the bearing device 44 via which the rotary cover 18 bears against the bottom wall of the main body forms a protrusion 84 of the reinforcing wall 38 extending toward the bottom wall of the main body, this protrusion 84 having a free edge 86 intended to be in contact with the bottom wall. More specifically, the reinforcing wall 38 has an internal edge 85 facing the bottom wall, the protrusion 84 extending from this internal edge 85 of the reinforcing wall 38 toward the bottom wall of the main body. The height of the protrusion 84 corresponds at least to the height measured between the internal edge 85 of the reinforcing wall 38 and the internal face of the bottom wall. In addition, the protrusion 84 extends over only part of the length of the reinforcing wall 38, the length being measured along an axis parallel to the longitudinal direction L. The protrusion 84 is positioned between the support 70 and the first longitudinal end 46 of the covering wall 36, in the longitudinal direction L.

As illustrated in FIG. 6, which is a view of the connector 14 in section on the first plane of section P, the protrusion 84 of the reinforcing wall 38 is in contact with the bottom wall 20 of the main body 16. More specifically and according to this second embodiment, the bottom wall 20 comprises a slot 88 at least partially housing the free edge 86 of the bearing device 44. The slot 88 has a length and a width sufficient for the free edge 86 of the protrusion 84 to at least become lodged in the slot 88.

According to an alternative embodiment, the bottom wall 20 is planar, the protrusion 84 being directly in contact with the internal face of the bottom wall 20. What is meant by "planar" is that the bottom wall 20 has neither a slot nor a rib in or on its internal face.

After the hook of the arm has been installed in the connector 14 of the wiper, the rotary cover 18 is secured to the bottom wall 20 of the main body 16 by the fixing lug 72 of the rotary cover 18. Once installed, the free edge 86 of the protrusion 84 of the reinforcing wall 38 butts against the bottom of the slot 88, thus preventing the rotary cover 18 from being pushed further into the internal volume 24 of the main body 16. In addition, the free edge 86 of the protrusion 84 and the fixing lug 72 are produced in such a way as to sandwich the bottom wall 20, the heights of each of these elements being designed to allow this sandwich arrangement.

A third embodiment will now be described with reference to FIGS. 7 and 8, and in this embodiment certain references used in the description of the preceding embodiments will also be reused, these references being attributed to objects of the invention that are similar.

According to this third embodiment and with reference to FIG. 7, the bearing device 44 via which the rotary cover 18 bears against the bottom wall of the main body likewise comprises the protrusion 84 of the reinforcing wall 38 extending toward the bottom wall of the main body, this protrusion 84 having a free edge 86 intended to be in contact with the bottom wall. However, and unlike the protrusion 84 described in the second embodiment of the invention hereinabove, the height of the protrusion 84 is less than a height measured between the internal edge 85 of the reinforcing wall 38 and the internal face of the bottom wall.

As illustrated in FIG. 8, which is a view of the connector 14 in section on the first plane of section P, the bottom wall 20 comprises a rib 90 which projects from the bottom wall 20 toward the rotary cover 18 in the longitudinal direction L and vertical direction V. The rib 90 has a free end edge 92 in contact with the free edge 86 of the protrusion 84 of the reinforcing wall 38 when the rotary cover 18 is secured to the bottom wall 20 by the fixing lug 72. More specifically, the rotary cover 18, and more specifically the protrusion 84 of the reinforcing wall 38, bears against the rib 90 of the bottom wall 20 when the rotary cover 18 is secured to the bottom wall 20 by the fixing lug 72, thus preventing the rotary cover 18 from being pushed further into the internal volume 24 of the main body 16. In addition, the free edge 86 of the protrusion 84, the fixing lug 72 and the rib 90 are produced in such a way as to sandwich the bottom wall 20, the heights of each of these elements being designed to allow this sandwich arrangement.

A fourth embodiment will now be described with reference to FIGS. 9 and 10, and in this embodiment certain references used in the description of the preceding embodiments will also be reused, these references being attributed to objects of the invention that are similar.

According to this fourth embodiment and with reference to FIG. 9, the bearing device 44 via which the rotary cover 18 bears against the bottom wall of the main body comprises at least one tab 94, 96 extending parallel to the main plane of extension of the reinforcing wall 38 of the rotary cover 18 from the covering wall 36 toward the bottom wall of the main body.

More specifically and according to the example illustrated here, the bearing device 44 comprises a first tab 94 and a second tab 96 each extending from one of the lateral edges 50 of the covering wall 36 toward a free end 98. The two tabs 94, 96 are advantageously aligned with one another along an axis parallel to the transverse direction T while extending in mutually distinct and mutually parallel planes. The two tabs 94, 96 have the same height, this height corresponding to the height measured between a line from which one of the tabs 94, 96 emerges from one of the lateral edges 50 of the covering wall 36, and the free end 98.

As illustrated in FIG. 10 which is a view of the connector 14 in section on a second plane of section Q parallel to the transverse direction T and vertical direction V and illustrated in FIG. 2, the free end 98 of each of the tabs 94, 96 of the rotary cover 18 is in contact with the bottom wall 20, the first and second tabs 94, 96 of the rotary cover 18 extending along the lateral walls 22 of the main body 16. More specifically, the tabs 94, 96 of the rotary cover 18 bear via their free end 98 against the bottom wall 20 when the rotary cover 18 is secured to the bottom wall 20 by the fixing lug 72, thus preventing the rotary cover 18 from being pushed further into the internal volume 24 of the main body 16. The location at which the free ends 98 come to bear against the bottom wall 20 is advantageously in the immediate vicinity of the corner formed between the bottom wall 20 and the lateral walls 22 in the internal volume 24.

The invention is not, however, limited to the means and configurations described and illustrated here, but also extends to any equivalent means or configuration described and illustrated here, and also extends to any equivalent means or configuration and to any technically operational combination of such means. In particular, the position of the protrusion or else of the tabs of the rotary cover may vary outside of the embodiment examples. In addition, the embodiments described hereinabove are not strictly limiting and may be combined with one or more other embodiments described above.

What is claimed is:

1. A connector for a wiper comprising:
a main body and a rotary cover, where the main body includes a bottom wall and two lateral walls that contribute to delimiting an internal volume that is at least partially closed by the rotary cover;
where the rotary cover includes a covering wall, a reinforcing wall, an articulation and an attachment device;
the rotary cover configured to secure to the bottom wall of the main body;
the covering wall extending longitudinally between two longitudinal ends of the covering wall and configured to be in contact with the lateral walls of the main body, where the articulation is formed at a longitudinal end of the covering wall and allows the rotary cover to rotate about an axis;
the rotary cover includes a bearing device formed with a set of elongated tabs spaced apart, which each extend from the covering wall to free terminal ends thereof;
the free terminal ends of said elongated tabs mutually engage in-contact with the bottom wall when the rotary cover bears fully against the bottom wall of the main body.

2. The connector of claim 1, wherein the attachment device includes a support wall and a fixing lug, the support wall extending from the covering wall toward the bottom wall of the main body and having a free end.

3. The connector of claim 2, wherein the support wall of the attachment device extends in a plane secant to and distinct from the plane in which the reinforcing wall is inscribed.

4. The connector of claim 2, wherein the bearing device and the fixing lug are configured to at least partially house the bottom wall of the main body.

5. The connector of claim 1, wherein the reinforcing wall forms an internal edge extending toward the bottom wall of the main body, the reinforcing wall including a free end configured to be in contact with the bottom wall.

6. The connector of claim 1, wherein the covering wall of the rotary cover is housed in the internal volume of the main body.

7. The connector of claim 1, wherein the articulation includes at least one rotation bearing which is open, the rotary cover pivoting about the main body, the articulation including at least one notch distinct from the rotation bearing and facilitating an insertion into the main body through a rotation bearing.

8. A wiper with at least one connector comprising:
a main body and a rotary cover, where the main body includes a bottom wall and two lateral walls that contribute to delimiting an internal volume that is at least partially closed by the rotary cover;
where the rotary cover includes a covering wall, a reinforcing wall, an articulation and an attachment device;
the rotary cover configured to secure relative to the bottom wall of the main body;
the covering wall extending longitudinally between two longitudinal ends of the covering wall and configured to be in contact with the lateral walls of the main body, where the articulation is formed at a longitudinal end of the covering wall and allows the rotary cover to rotate about an axis; and
the rotary cover includes a bearing device that forms elongated tabs that are spaced apart, which all extend from the covering wall such that free terminal ends of each of the elongated tabs mutually engage in-contact with the bottom wall when the rotary cover bears fully against the bottom wall of the main body.

9. A connector for a wiper comprising:
a main body and a rotary cover, the main body including a bottom wall of the main body and two lateral walls;
the rotary cover including at least a covering wall, a reinforcing wall, an articulation and an attachment device for securing the rotary cover relative to the bottom wall;
the covering wall extending longitudinally between two longitudinal ends;
the articulation being formed at one of the longitudinal ends of the covering wall such that the rotary cover is configured to rotate about an axis; and
the rotary cover including a support wall that forms a fixing lug and elongated tabs that all extend from the covering wall such that free terminal ends of each of the elongated tabs mutually engage in-contact with the bottom wall when the rotary cover fully bears against the bottom wall of the main body;
each of the free terminal ends of the elongated tabs located along opposing sides of the bottom wall when with the rotary cover completes engagement with the main body.

* * * * *